July 15, 1958     E. M. BANDY     2,843,302
HOLDER FOR POURING CONTAINERS
Filed May 10, 1954
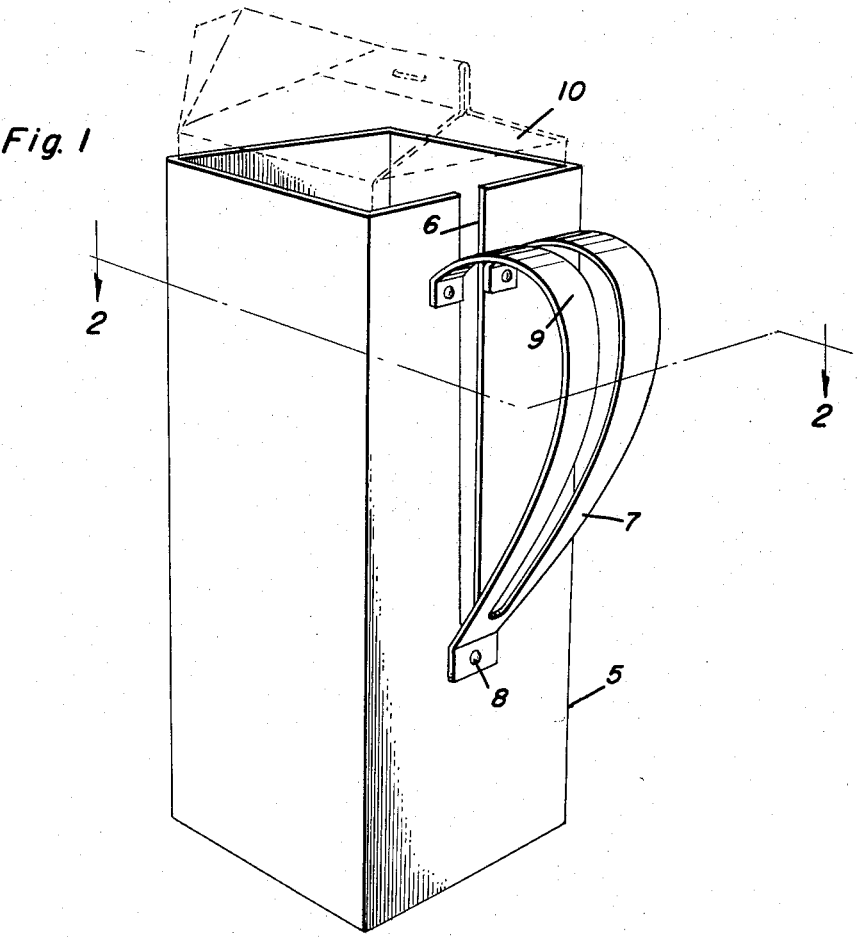
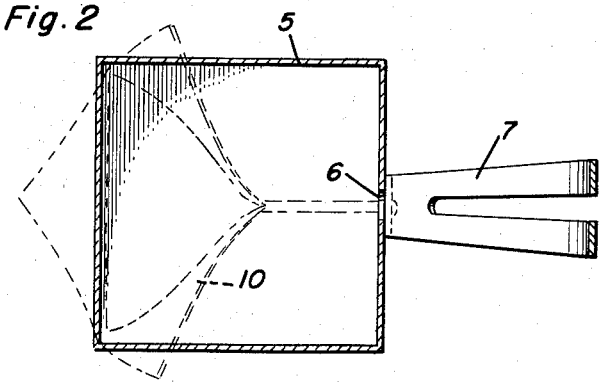
Edgar M. Bandy
INVENTOR.
BY *[signature]*
                     *Attorneys*

United States Patent Office 2,843,302
Patented July 15, 1958

2,843,302

HOLDER FOR POURING CONTAINERS

Edgar M. Bandy, Lindsay, Calif.

Application May 10, 1954, Serial No. 428,738

1 Claim. (Cl. 224—45)

The present invention relates to new and useful improvements in holders for milk cartons and other pouring containers for conveniently holding the carton while the contents thereof are being poured.

An important object of the invention is to provide a contractible holder of this character by means of which the carton is firmly gripped during the pouring operation.

Another object of the invention is to provide a handle for the holder which operates to contract the holder in gripping engagement with the carton upon a squeezing action applied to the handle.

A still further object is to provide a device of this character of simple and practical construction, which is neat and attractive in appearance, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view; and

Figure 2 is a transverse sectional view taken on a line 2—2 of Figure 1.

Referring now to the drawing in detail, wherein for the purpose of illustration, I have disclosed a preferred embodiment of the invention, the numeral 5 designates the holder which is constructed in the shape of a vertically elongated container of square shape in cross-section and which may be constructed of light weight resilient metal, plastic or other self-supporting material. The top of the holder 5 is open, and a vertical slot 6 is formed in its upper portion.

A substantially V-shaped handle 7 is secured at its lower or crotch portion to the holder immediately below the slot 6 by means of a rivet or other suitable fastener 8, and the forked upper ends 9 of the handle are similarly secured to the holder adjacent the upper portion thereof and at opposite sides of the slot 6.

The holder 5 is adapted to receive a milk carton or other pouring container 10 in a position so that the upper end of the carton protrudes above the top of the holder in order that the contents of the carton may be poured therefrom. As the handle 7 is gripped by the hand of a person and a squeezing action applied thereto, the walls of the holder will be contracted to firmly grip the carton and hold the latter in position while the holder is being tilted to pour the contents of the carton.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A holder for pouring containers comprising a hollow body having an open top and a closed bottom and a vertical slot in one side thereof extending from said top and terminating in spaced relation to said bottom and whereby said body is adapted to be contracted to grip a container therein, and an outwardly bowed elongated handle of flat material having a lower end attached to said side of the body below and in line with said slot, said handle having a longitudinal central slot therein spaced from said lower end and providing spaced upper ends on the handle and whereby the handle is contractible by squeezing the same, said upper ends of the handle being attached to said side of the body below said top and at opposite sides of the slot in said body whereby the body may be contracted by contracting said handle, said handle flaring edgewise upwardly to space its upper ends at opposite sides of the slot in said body.

References Cited in the file of this patent

UNITED STATES PATENTS

| | | |
|---|---|---|
| 791,781 | Henckel | June 6, 1905 |
| 1,213,517 | McAdams | Jan. 23, 1917 |
| 1,755,335 | Roman | Apr. 22, 1930 |
| 2,070,367 | Mackilbank | Feb. 9, 1937 |
| 2,122,628 | Tracy | July 5, 1938 |
| 2,225,891 | Sprung | Dec. 24, 1940 |
| 2,755,977 | Malcolm | July 24, 1956 |